(12) United States Patent
Tsai (10) Patent No.: US 7,783,368 B2
(45) Date of Patent: Aug. 24, 2010

(54) CONTROL SYSTEM AND ADJUSTING METHOD THEREOF

(75) Inventor: Chin-Shiong Tsai, Tainan County (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 465 days.

(21) Appl. No.: 11/756,825

(22) Filed: Jun. 1, 2007

(65) Prior Publication Data

US 2008/0234839 A1    Sep. 25, 2008

(51) Int. Cl.
*G05B 13/02* (2006.01)
(52) U.S. Cl. .............................. 700/29; 700/28; 700/41; 700/170
(58) Field of Classification Search ...................... 700/1, 700/8–10, 19, 28–30, 32, 40, 41, 44, 45, 700/170
See application file for complete search history.

(56) References Cited

U.S. PATENT DOCUMENTS

| 5,666,034 | A * | 9/1997 | Seoung et al. | 318/561 |
| 5,773,938 | A * | 6/1998 | Seong et al. | 318/561 |
| 6,567,711 | B1 * | 5/2003 | Hosek et al. | 700/30 |
| 6,668,202 | B2 * | 12/2003 | Makino et al. | 700/56 |
| 7,181,295 | B2 * | 2/2007 | Yu et al. | 700/42 |
| 2002/0099677 | A1 * | 7/2002 | Calise et al. | 706/23 |
| 2003/0133220 | A1 * | 7/2003 | Hsin | 360/77.04 |
| 2003/0197490 | A1 * | 10/2003 | Garrigan et al. | 322/20 |
| 2003/0201684 | A1 * | 10/2003 | Browning et al. | 310/90.5 |
| 2005/0182499 | A1 * | 8/2005 | Calise et al. | 700/28 |

FOREIGN PATENT DOCUMENTS

| CN | 1071912 | 9/2001 |
| CN | 1533020 | 9/2004 |
| DE | 244 837 | 4/1987 |
| DE | 693 24 097 T2 | 10/1999 |
| DE | 10 2004 010 317 | 12/2004 |
| DE | 10 2005 042 650 | 3/2007 |
| EP | 0 797 133 | 9/1997 |
| JP | 2001242904 | 9/2001 |

* cited by examiner

*Primary Examiner*—Charles R Kasenge
(74) *Attorney, Agent, or Firm*—Volpe and Koenig, P.C.

(57) ABSTRACT

A control system used to control a controlled plant includes a main control unit, a first tuning unit, and a second tuning unit. The control system regulated by two weighting parameters of a first multiple and a second multiple, robustness and rapid response are attained, and excess of the output signal the controlled plant generates disappears or approaches zero. The control system has technical features of objective bandwidth, offsetting of low frequency disturbance, and matching of transfer functions. By designing the main control unit, the first tuning unit, and the second tuning unit, regulating the two weighting parameters of the first multiple and the second multiple, and tuning the actual system, the above technical features are obtained.

16 Claims, 9 Drawing Sheets

CONTROL SYSTEM AND ADJUSTING METHOD THEREOF

FIELD OF THE INVENTION

The present invention relates to a control system and an adjusting method thereof, and more particularly relates to a robust control system.

BACKGROUND OF THE INVENTION

The control systems become more and more important in promoting the development of the modern civilization and technology. For example, the home electrical appliances, automobiles, and nightstools in the bathroom are all control systems, which are more popular in industrial application.

For the application of the servomechanism, a mathematics model is first set up according to the physical behavior of the system, whereby the behavior of the system is conveniently predicted and controlled by the use of the control function in the mathematics model.

The traditional Proportional Integral Differential (PID) controller includes the proportional term, the integral term and the differential term, wherein the proportional item is used to tune the output of the controller according to the dimension of the inaccuracy, the integral term is used to dissipate the inaccuracy in steady state, and the differential term is functional for predicting the trend of inaccuracy. The PID controller is still widely used because of its simple structure.

Taking a motor as an example. Please refer to FIG. 1, which is a schematic block diagram of a motor control system according to the prior art.

Figure 1:
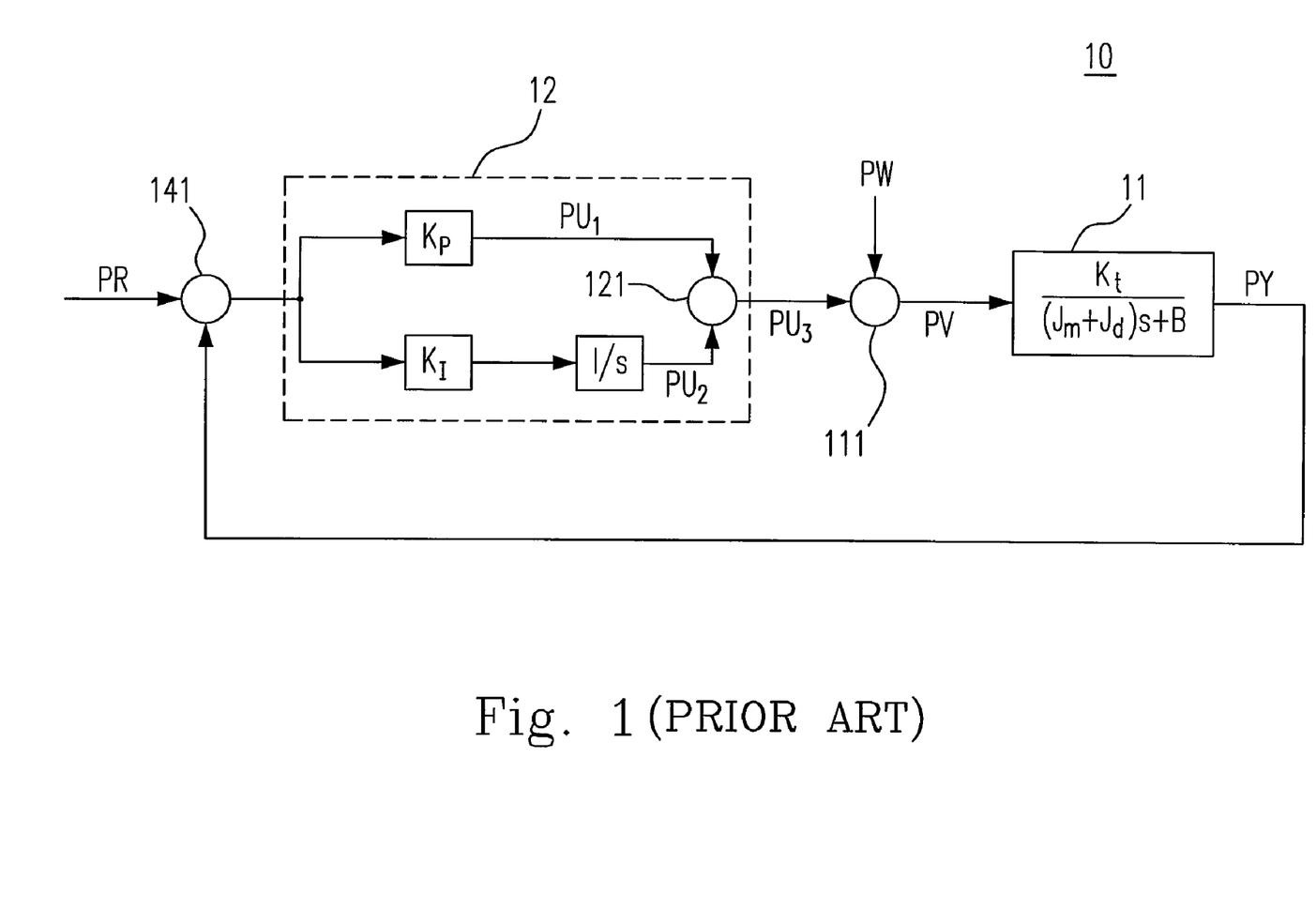
FIG. 1 is a schematic block diagram showing a conventional motor control system.

As shown in FIG. 1, the controlled body 11 in the control system 10 is a motor and its mathematics model is set up based on the physical behavior of the motor operation. The transfer function of the mathematics model is $K_t/((J_m+J_d)s+B)$, wherein $J_m$ is the inertia of the motor, $J_d$ is the inertia of the load, B is a damping coefficient, and $K_t$ is a value of ratio (proportion).

The controlled 11 receives a driving signal PV and accordingly produces an output signal PY, which is a rotational speed in this example. The motor is subject to an outside interference while operating, wherein the interference may result from the effects of electromagnetism or machinery. A third summer 111 is deposed to take the interference into consideration of control system 10, namely, the third summer 111 takes account of the sum of a third operating signal $PU_3$ from a master controller 12 in front and a interfering signal PW to produce a drive signal PV to drive the motor.

The diagram of the conventional motor shown in FIG. 1 has been simplified. To describe more completely, the third operating signal $PU_3$ passes trough a high-frequency electric current circuit and then combines with the interfering signal PW, while the third operating signal $PU_3$ is an equivalent armature electric current and the interfering signal PW is an interfering torque.

The master controller 12 in FIG. 1 is a kind of proportional integral controller. The transfer function of the controller 12 is $K_P+K_I*1/s$, which includes a proportional function $K_P$ and a integral function $K_I*1/s$. The proportional function $K_P$ as a proportional coefficient is for raising the gain bandwidth of an open loop of the control system 10, so as to make the control system 10 to response quickly. The $K_I$ is an integral coefficient, which is used to reduce the following error of stable state in the control system 10.

Because the response speed goes faster with the wider target bandwidth $B_w$ of the control system 10, the proportional coefficient $K_P$ is set as $2\pi B_w(J_m+J_d)/K_t$ generally to ensure the gain bandwidth of the open loop will be provided with the target bandwidth $B_w$.

The master controller 12 receives an error signal PE, and then the error signal PE is processed by the proportional function $K_P$ to produce a first operating signal $PU_1$, and processed with by the integral function $K_I*1/s$ to generate a second operating signal $PU_2$. The first operating signal $PU_1$ and the second operating signal $PU_2$ are summed by a second summer 121 to output an third operating signal $PU_3$.

The control system 10 is a kind of closed loop control system and deposed with a first summer 141. The first summer 141 subtract the output signal PY of the controlled body 11 from the input signal PR containing a command of the defined values to produce an error signal PE for the master controller 12. The purpose of the whole closed loop control system 10 is to keep the amplitude of the output signal PY to be identical to that of the input signal PR as far as possible, so as to reduce the influence of the interfering signal PW.

Figure 2:
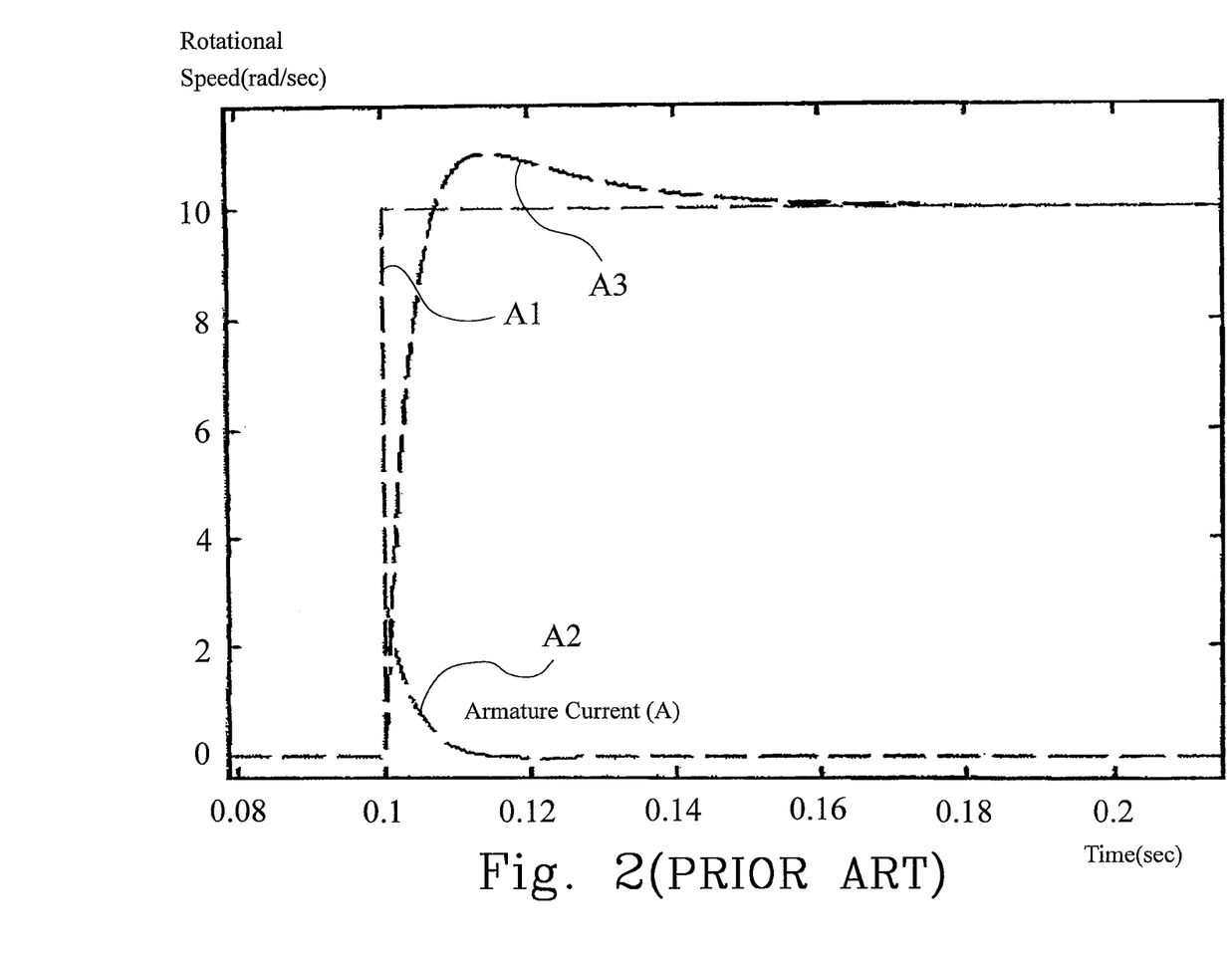
FIG. 2 is a diagram showing the step response of a conventional control system.

Please refer to FIG. 2, which is a step response diagram of a control system according to the prior art. The curve A1 of the input signal of step function command, the curve A2 of the third operating signal and the curve A3 of the output signal are illustrated in FIG. 1.

As shown in FIG. 2, the input signal PR is set as a step function command and processed by the master controller 12 to produce the third operating signal $PU_3$, which will be provided to the controlled body 11. When the control system 11 in FIG. 1 asks for the faster response and minimum error, a larger overshoot will exist in the output signal PY of the controlled body 11.

In addition, since the response of most of the industry process is very slow, it would meet the difficulty when adopting the proportional coefficient, integral coefficient, and a differential coefficient of a differential function to adjust the response of the output signal from the control system.

A user probably needs to wait for several minutes or even several hours for observing the responses produced by the adjusting, and thus it becomes a boring and time-wasting job that tuning the controller by the method of try and error. Sometimes, it is even unable to adjust to meet the system's demands.

In sum, the main motivity of the present application is to reduce the overshoot of the outputting signals of the controlled body while the control system processes with fast response and minimum error, as well as reducing the tuning time and procuring the control system robust.

From the above description, in order to overcome the drawbacks in the prior art, a control system and a method for tuning the system thereof are provided by the inventor via the devoting research and perseverance working.

SUMMARY OF THE INVENTION

In accordance with one aspect of the present invention, a control system and an adjusting method is provided to obtain the robustness and fast response of the control system, and the overshoot of the output signal of the controlled body is diminished and approaches to zero.

In accordance with another aspect of the present invention, a control system controlling an output signal produced by a controlled object is provided, the control system having a bandwidth and represented by a first mathematic model having a first transfer function, the control system comprising a master control unit, a first adjusting unit, and a second adjusting unit; wherein the master control unit represented by a second mathematic model having a second transfer function configured to make an open loop bandwidth of the control system approach to a target bandwidth and generate a first operating signal; the first adjusting unit represented by a third mathematic model having a third transfer function and configured to receive the first operating signal and generate a first adjusting signal, wherein the first adjusting signal, the output signal, and the first operating signal are calculated for generating a second operating signal, and the output signal approaches to the first adjusting signal, so that an interference signal the controlled object subjects is offset; and the second adjusting unit represented by a fourth mathematic model having a fourth transfer function and configured to receive an input signal for generating a second adjusting signal, wherein the second adjusting signal, the output signal and the input signal are calculated for generating a third operating signal, which is provided for the master control unit and causes the first transfer function of the control system approaching to the fourth transfer function of the second adjusting unit.

Preferably, the master control unit comprises a Proportional Integral (PI) Controller.

Preferably, the control system further comprise a first adder, a loop stabilizer, a first amplifier, and a second adder; wherein the first adder configured to generate a first result signal by subtracting the output signal from the second adjusting signal; the loop stabilizer receiving the first result signal to generate a second result signal, and represented by a fourth mathematic model having an integral function to cause the control system obtaining a status of zero steady state error; the first amplifier receiving the second result signal and generating a third result signal by amplifying the second result signal by a first multiple, wherein the first multiple is adjusted so that the first transfer function of the control system approaches to the fourth transfer function of the second adjusting unit; and the second adder configured to generate the third operating signal by summing up the input signal and the third result signal and taking off the output signal.

Preferably, the controlled object is a motor.

Preferably, when the controlled object is a motor, the controlled object has a physical behavior presented by the first transfer function, $K_t/((J_m+J_d)s+B)$, wherein $J_m$ is an inertia of the motor, $J_d$ is an inertia of a load, B is a damping coefficient, and $K_t$ is a ratio; the second transfer function of the master controlled unit is $2\pi B_w J_\Sigma/K_t$, wherein $B_w$ is the target bandwidth and $J_\Sigma$ is an estimated inertia value of $(J_m+J_d)$; the third transfer function of the first adjusting unit is $K_t/(J_\Sigma s)$; and the fourth transfer function of the second adjusting unit is $K_t/(J_\Sigma s)$.

In accordance with another aspect of the present invention, a control system controlling an output signal produced by a controlled object is provided, the control system having a bandwidth and represented by a first mathematic model having a first transfer function, the control system comprising a master control unit and a first adjusting unit; wherein the master control unit represented by a second mathematic model having a second transfer function configured to make an open loop bandwidth of the control system approach to a target bandwidth, and generate a first operating signal; and the first adjusting unit represented by a third mathematic model having a third transfer function and configured to receive the first operating signal and generate a first adjusting signal, wherein the first adjusting signal, the output signal, and the first operating signal are calculated for generating a second operating signal, and the output signal approaches to the first adjusting signal, so that an interference signal the controlled object subjects is offset.

Preferably, the controlled object has a physical behavior and the master control unit is designed according to the physical behavior of the controlled object.

Preferably, the master control unit comprises a Proportional Integral (PI) Controller.

Preferably, the controlled object has a responsive behavior and the first adjusting unit is designed according to the responsive behavior of the controlled object.

Preferably, the control system according to claim 6 further comprising a first adder and a first amplifier; wherein the first adder configured to generate a result signal by subtracting the output signal from the first adjusting signal; the first amplifier configured to receive the first result signal and generate a second result signal by amplifying the first result signal by a first multiple, wherein the first multiple is adjusted so that the output signal approaches to the first adjusting signal.

Preferably, the control system according further comprising a second adder configured to sum up the second operating signal and the interference signal and provide the controlled object with a summation result of the second operating signal and the interference signal.

Preferably, the control system further comprising a second adjusting unit represented by a fourth mathematic model having a fourth transfer function and configured to receive a input signal and thereby generate a second adjusting signal, wherein the second adjusting signal, the output signal and the input signal are calculated for generating a third operating signal provided to the master control unit, so that the first transfer function of the control system approaches to the fourth transfer function of the second adjusting unit.

Preferably, the control system further comprising a third adder, a loop stabilizer, a second amplifier, and a fourth adder; wherein the third adder configured to generate a third result signal by subtracting the output signal from the second adjusting signal; the loop stabilizer configured to receive the third result signal, and thereby generate a fourth result signal, the loop stabilizer represented by a fifth mathematic model having an integral function to cause the control system obtaining a status of zero steady state error; the second amplifier configured to receive the fourth result signal and generate a fifth result signal by amplifying the fourth result signal by a second multiple, wherein the second multiple is adjusted so that the first transfer function of the control system approaches to the fourth transfer function of the second adjusting unit; and the fourth adder configured to generate the third operating signal by summing up the input signal and the fifth result signal and taking off the output signal.

In accordance with a further aspect of the present invention, an adjusting method of a control system for adjusting an output signal generated by a controlled object is provided, the control system having a bandwidth and represented by a first mathematic model having a first transfer function, the method comprising:

(a) setting up a target bandwidth for the control system;

(b) designing a control function based on the target bandwidth, and thereby causing a open loop bandwidth of the control system approaching to the target bandwidth and generating a first operating signal;

(c) generating a first adjusting signal based on the first operating signal; and (d) calculating the first adjusting signal, the output signal and the first operating signal for generating a second operating signal, and thereby causing the output signal approaching to the first adjusting signal by feeding the second operating signal back to the controlled object generating the output signal.

Preferably, the step (c) of the adjusting method further comprises the steps of:

(c1) designing a first adjusting function according to a responsive behavior of the controlled object; and (c2) processing the first operating signal by the first adjusting function for generating the first adjusting signal.

Preferably, the step (d) of the adjusting method further comprises the steps of:

(d1) generating a result signal by subtracting the output signal from the first adjusting signal;

(d2) generating a second result signal by amplifying the first result signal by a first multiple;

(d3) generating the second operating signal by summing up the second result signal and the first operating signal; and (d4) adjusting the value of the first multiple so that the output signal approaches to the first adjusting signal.

Preferably, the adjusting method further comprises the steps of:

(e) providing an input signal to a second adjusting function for generating a second adjusting signal; and (f) calculating the second adjusting signal, the output signal and the input signal to generate a third operating signal, and causing the first transfer function of the control system approaching to the second adjusting function.

Preferably, the step (f) of the adjusting method further comprises the steps of:

(f1) generating a third result signal by subtracting the output signal from the second adjusting signal;

(f2) receiving the third result signal and processing the third result signal by an integral calculation, so as to generate a fourth result signal;

(f3) generating a fifth result signal by amplifying the fourth result signal by a second multiple;

(f4) generating the third operating signal by summing up the fifth result signal and the input signal and taking off the output signal; and (f5) adjusting the value of the second multiple so that the first transfer function of the control system approaches to the second adjusting function.

The above objects and advantages of the present invention will become more readily apparently to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

In order to describe the control system and the method for tuning the system thereof in the present invention, the multiple preferred embodiments are listed as following. It is to be noted that the following descriptions of preferred embodiments of this invention are presented herein for the purposes of illustration and description only; it is not intended to be exhaustive or to be limited to the precise form disclosed.

Figure 3:
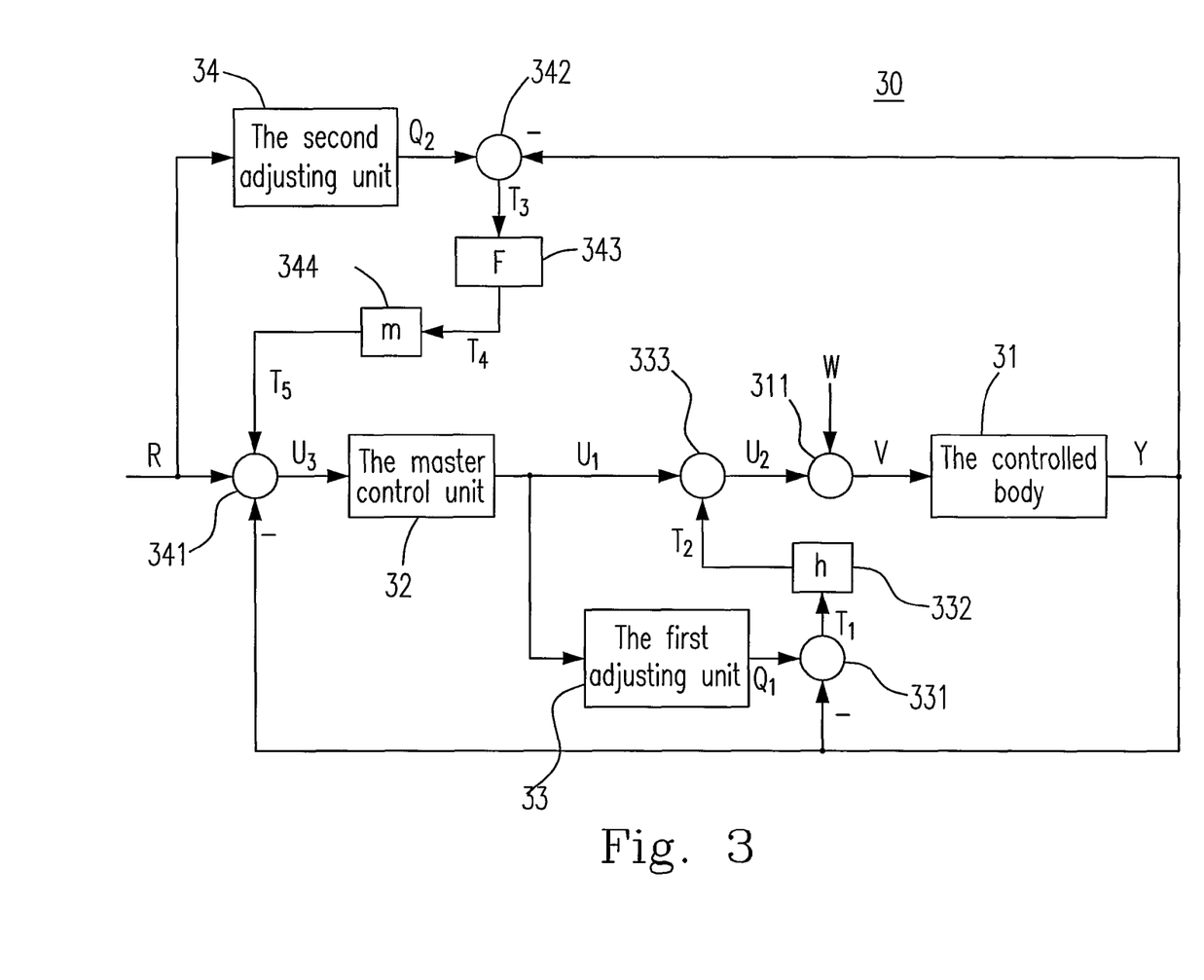
FIG. 3 is a schematic block diagram showing the control system of the present invention.

Please refer to FIG. 3, which is a block diagram showing the first embodiment for the control system according to the present invention. As shown in FIG. 3, a control system 30 is configured to control an output signal Y generated by a controlled body 31, and includes a master control unit 32, a first adjusting unit 33, and a second adjusting unit 34. The master control unit 32 is the kernel of the control system 30. The master control unit 32 is designed based on the physical behavior of the controlled body 31, while the control system 30 operates in a open loop status and the first adjusting unit 33 and the second adjusting unit 34 do not join the operation of the control system 30. Accordingly, the open loop bandwidth of the control system 30 approaches to a target bandwidth $B_w$, and a first operating signal $U_1$ is generated.

In the aforesaid procedure, a first multiple h of a first amplifier 332 in the circuit the first adjusting unit 33 passes through is set as zero to make the first adjusting unit 33 not join the control system 30, and a second multiple m of a second amplifier 344 in the circuit the second adjusting unit 34 passes through is set as zero to make the second adjusting unit 34 not join the control system 30. The master control system 32 usually includes a Proportional Integral (PI) Controller.

The controlled body would be subject to an interference from unspecified factors, wherein the magnitude of the interference is a interference signal W, which is included in the control range of the control system 30 by using a third adder 311. The robustness of the control system 30 would be influenced by the interference signal W, and thus the control system 30 cannot operate stably. Thereupon the first adjusting unit 33 is joined into the control system 30, thereby the control system 30 is able to fast response to offset the interference signal W the controlled body subjects, and thus the robustness of the control system 30 is enhanced.

The first adjusting unit 33 is designed based on the responsive behavior of the controlled body 31, i.e. the transfer function of the first adjusting unit 33 is designed by simulating that of the controlled body 31. The first adjusting unit 33 receives a first operating signal $U_1$ and accordingly generates a first adjusting signal $Q_1$, wherein the first adjusting signal $Q_1$, the output signal Y, and the first operating signal $U_1$ are calculated for generating a second operating signal $U_2$. The third adder 311 sums up the second operating signal $U_2$ and the interference signal W for generating a driving signal V to drive the controlled body 31 and generate an output signal Y. By way of the feedback affection, the output signal Y is closed to the first adjusting signal $Q_1$, thereby the interference signal W the controlled body 31 subjects is offset. The first adjusting unit 33 is suitable for resisting the interference in lower frequency.

The procedure of calculating the first adjusting signal $Q_1$, the output signal Y and the first operating signal $U_1$ to generate the second adjusting signal $Q_2$ is illustrated as follows. The control system 30 further includes a first adder 331, a first amplifier 332, and a second adder 333. The first adder 331 generates a result signal by subtracting the output signal Y from the first adjusting signal $Q_1$. The first amplifier receives the first result signal and generates a second result signal by amplifying the first result signal by the first multiple h, wherein the first multiple is adjusted so that the output signal approaches to the first adjusting signal. Then the second adder 333 sums up the first operating signal $U_1$ and the second result signal $T_2$ to generate the second operating signal $U_2$.

The second adjusting unit 34 is joined for speeding up the response speed of the control system 30, further reducing the error and the overshoot of the controlled body output signal Y, and enhancing the stability of the control system 30. The second adjusting unit 34 receives an input signal R for generating a second adjusting signal $Q_2$, wherein the second adjusting signal $Q_2$, the output signal Y and the input signal R are calculated for generating a third operating signal $U_3$, which is provided for the master control unit 32. The first transfer function of the control system 30 will accordingly approaches to the second transfer function of the second adjusting unit 34.

The procedure of calculating the second adjusting signal $Q_2$, the output signal Y and the input signal R to generate the third operating signal $U_3$ is illustrated as follows.

The control system 30 further includes a fourth adder 342, a loop stabilizer 343, a second amplifier, and a fifth adder 341. The fourth adder is configured to generate a third result signal $T_3$ by subtracting the output signal Y from the second adjusting signal $Q_2$. The loop stabilizer 343 receives the third result signal $T_3$ to generate a fourth result signal $T_4$.

The loop stabilizer 343 further has an integral function F to cause the control system 30 to obtain a status of zero steady state error. The second amplifier 344 receives the fourth result signal $T_4$ and generates a fifth result signal $T_5$ by amplifying the fourth result signal $T_4$ by a second multiple m, wherein the second multiple m is adjusted so that the transfer function of the control system 30 approaches to the transfer function of the second adjusting unit 34. The fifth adder 341 is configured to generate the third operating signal $U_3$ by summing up the input signal R and the fifth result signal $T_5$, and taking off the output signal Y.

A second embodiment is further provided based on the FIG. 3. As shown in FIG. 3, a control system 30 is configured to control an output signal Y generated by a controlled body 31, and includes a master control unit 32 and a first adjusting unit 33. The master control unit 32 is the kernel of the control system 30. The master control unit 32 is designed based on a target bandwidth $B_w$ of the control system 30, while the control system 30 operates in a open loop status and the first adjusting unit 33 do not join the operation of the control system 30. The open loop bandwidth of the control system 30 accordingly approaches to a target bandwidth $B_w$ and a first operating signal $U_1$ is generated.

In the aforesaid procedure, a first multiple h of the first amplifier 332 in the circuit the first adjusting unit 33 passing through is set as zero to make the control system 30 operate without the first adjusting unit 33 joining. The master control unit 32 usually includes a Proportional Integral (PI) Controller. The master control unit 32 is designed based on the physical behavior of the controlled body 31 so that the open loop bandwidth of the control system easily approaches to a target bandwidth $B_w$. Furthermore, the control system 30 includes a fifth adder 341, which is configured to generate the third operating signal $U_3$ provided for the master control unit 32 by taking off the output signal Y from the input signal R.

The first adjusting unit 33 receives the first operating signal $U_1$ and accordingly generates a first adjusting signal $Q_1$, wherein the first adjusting signal $Q_1$, the output signal Y, and the first operating signal $U_1$ are calculated for generating a second operating signal $U_2$. The third adder 311 sums up the second operating signal $U_2$ and the interference signal W for generating a driving signal V to drive the controlled body 31 and generate an output signal Y. By way of the feedback affection, the output signal Y is closed to the first adjusting signal $Q_1$, thereby the interference signal W the controlled body 31 subjects is offset. The first adjusting unit 33 is usually designed based on the responsive behavior of the controlled body 31, i.e. the transfer function of the first adjusting unit 33 is designed by simulating that of the controlled body 31. The first adjusting unit 33 is suitable for resisting the interference in lower frequency.

The procedure of calculating the first adjusting signal $Q_1$, the output signal Y and the first operating signal $U_1$ to generate the second adjusting signal $Q_2$ is identical to that of the first embodiment.

The control system 30 in the second embodiment further includes a second adjusting unit 34. The second adjusting unit 34 is configured to receive an input signal R for generating a second adjusting signal $Q_2$, wherein the second adjusting signal $Q_2$, the output signal Y and the input signal R are calculated for generating a third operating signal $U_3$, which is provided for the master control unit 32 and causes the first transfer function of the control system 30 to approach to the second transfer function of the second adjusting unit 34.

The procedure of calculating the second adjusting signal $Q_2$, the output signal Y and the input signal R to generate the third operating signal $U_3$ is identical to that of the first embodiment.

For the servomechanism application, a motor is a common used controlled body. Please refer to FIG. 4, which is a block diagram showing the motor as a controlled body in the control system according to the present invention. The notations in the control system 40 in FIG. 4 identical to those in the control system 30 in FIG. 3 have the name denominations and functions.

Figure 4:
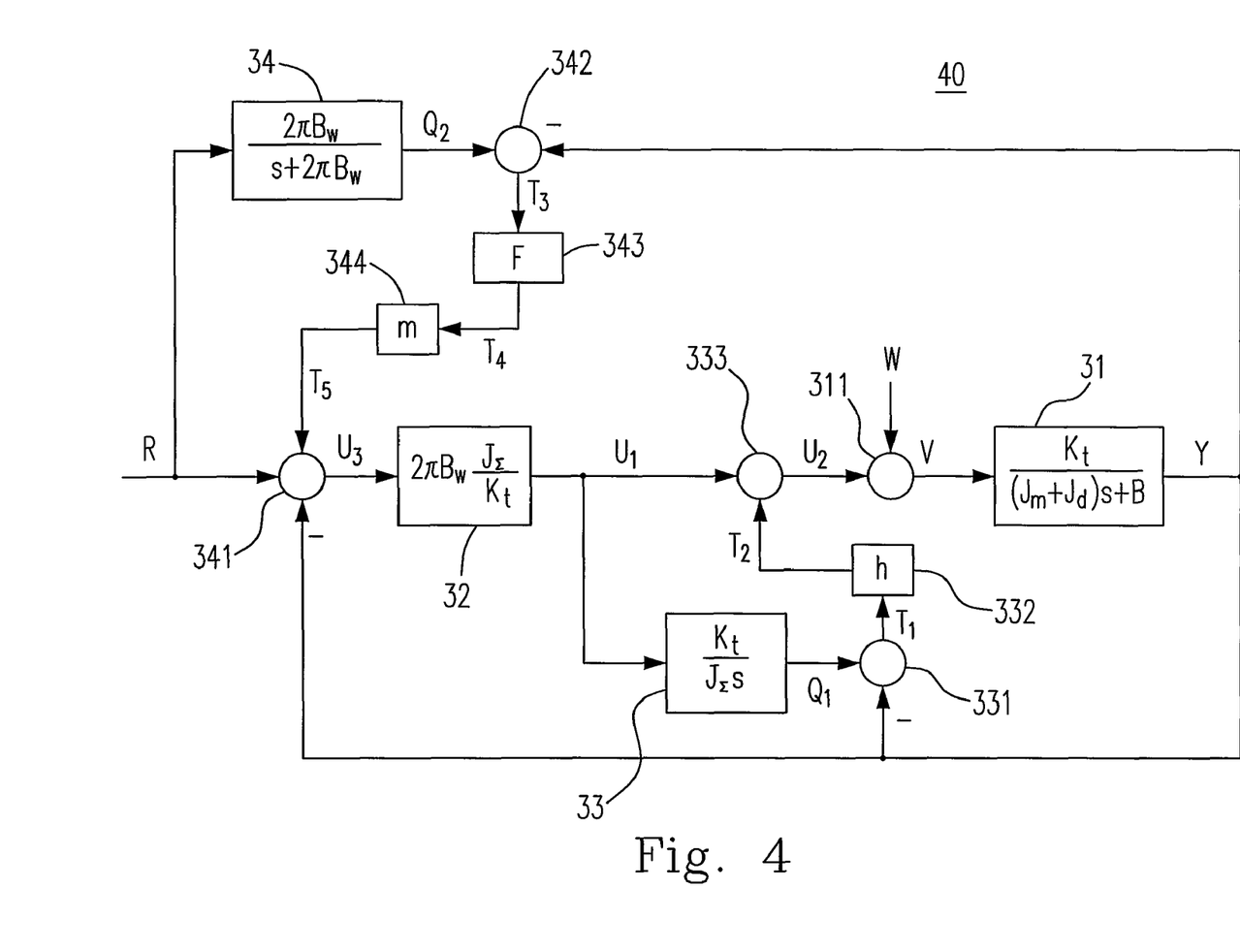
FIG. 4 is a schematic block diagram showing a motor as the controlled body of the control system according to the present invention.

As shown in FIG. 4, The transfer function of the physical behavior of the controlled body 31 is $K_t/((J_m+J_d)s+B)$, wherein $J_m$ is an inertia of the motor, $J_d$ is an inertia of a load, B is a damping coefficient, and $K_t$ is a ratio. In order to design the master control unit 32 according to the physical behavior of the control body 31, and design the first adjusting unit 33 according to the responsive behavior of the control body 31, an inertia estimated value $J_\Sigma$ is adopted to represent the total inertia value of the motor and the load $(J_m+J_d)$, wherein $J_m$ is an inertia of the motor, $J_d$ is an inertia of a load. The transfer function of the master control unit 32 is designed as $2\pi B_w J_\Sigma/K_t$, wherein $B_W$ is the target bandwidth of the control system 40 and $J_\Sigma$ is the estimated inertia value of $(J_m+J_d)$, so that the open loop bandwidth of the control system 40 approaches to the target bandwidth $B_w$.

The transfer function of the first adjusting unit 33 is designed as $K_t/(J_\Sigma s)$ according to the responsive behavior of the controlled body 31, whereby the output signal Y the controlled body 31 generates approaches to the first adjusting signal $Q_1$, the first adjusting unit 33 generates via the calculation and feedback affection. The transfer function of the second adjusting unit 34 is designed as $K_t/((J_m+J_d)s+B)$, wherein $J_m$ is an inertia of the motor, $J_d$ is an inertia of a load, B is a damping coefficient, and $K_t$ is a ratio, and whereby the transfer function of the control system 40 approaches to that of the second adjusting unit 34 via the calculation and feedback affection.

Figure 5:
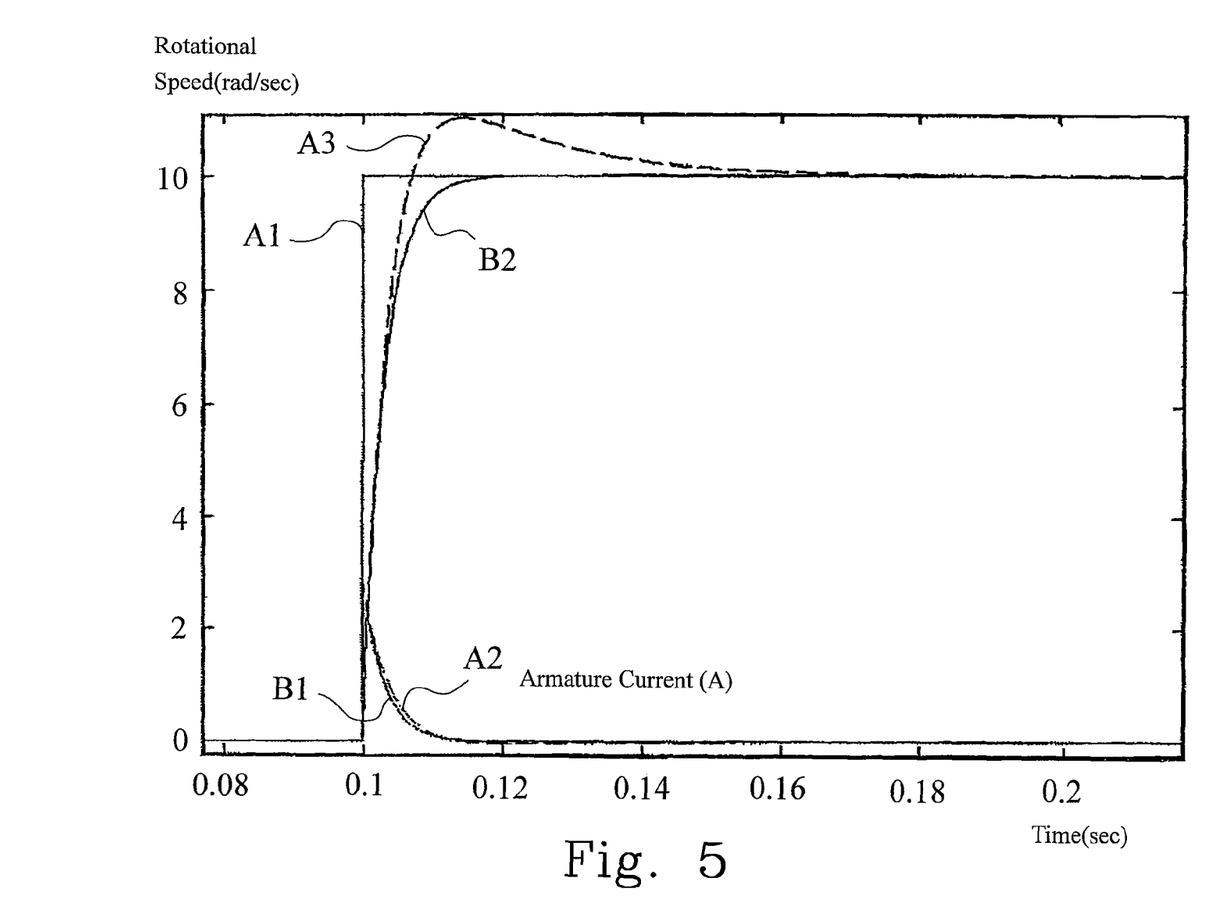
FIG. 5 is a diagram showing the first step response of the control system showing in FIG. 4.

Please refer to FIG. 5, which is diagram showing the comparison result of the first step response of the control system 40 in FIG. 4 and the conventional control system 10 in FIG. 1, and in case that setting the target bandwidth $B_w=50$ Hz, the first multiple h=1, and the second multiple m=1. Since the control system 10 is a common P-I-D (Proportional Integral Differential) control structure, a Proportional Integral (PI) controller with the target bandwidth $B_w=-50$ Hz is taken as an example here.

As shown in FIG. 5, there are an input signal curve of a step function command A1, the third operating curve A2 and the output signal curve A3 of the control system 10 in FIG. 1, and the second operating curve B1 and the output signal curve B2 of the control system 40 in FIG. 4. At this time the first adjusting signal $Q_1$ of the control system 40 corresponding to a first adjusting signal curve (not shown) is generated by the first adjusting unit 33 with a step of 50 Hz bandwidth. As FIG. 5 shows, the output signal curve B2 of the control system 40 of the present invention has no overshoot, and rather approaches to the first adjusting signal curve, so as to easily overcome the influence of the damping coefficient B.

Figure 6:
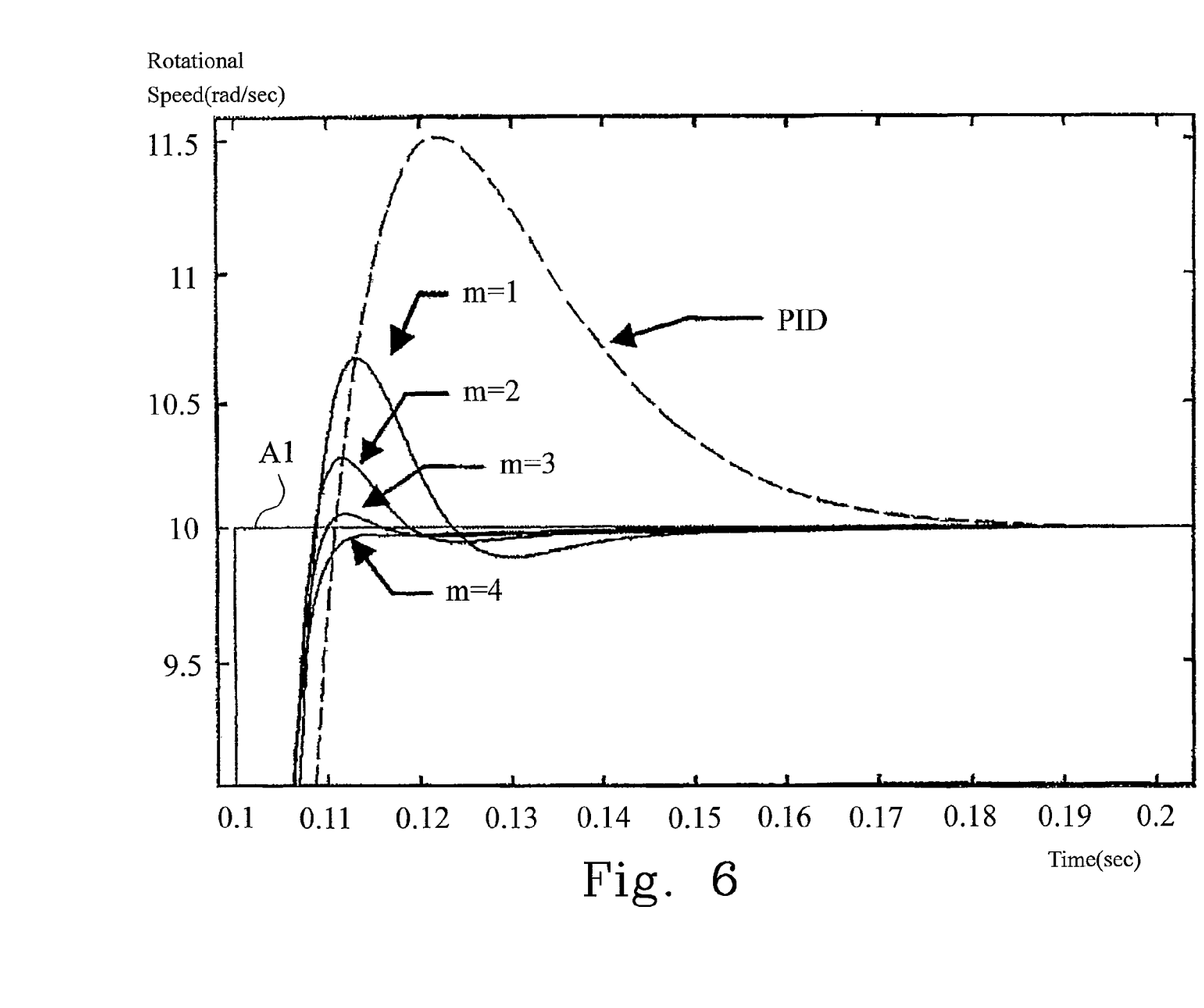
FIG. 6 is a diagram showing the second step response of the control system showing in FIG. 4.

Please refer to FIG. 6, which is a diagram of the second step response of the control system 40 in FIG. 4, and provided for illustrating the influence of the second multiple m to the control system 40. In the FIG. 6, the estimated inertia is set as $J_\Sigma=(J_m+J_d)/2$, the target bandwidth is set as $B_w=50$ Hz, and the first multiple is set as h=1. The second multiple m is set as varied m=1, 2, 3, 4.

As shown in FIG. 6, there are an input signal curve of a step function command A1, the curves of the varied second multiple m=i (i=1, 2, 3, 4) of the control system 40 in FIG. 4, and the output signal curve PID of the control system 10 in FIG. 1 for comparison. As FIG. 6 shows, the output signal curve P-I-D of the prior P-I-D control system 10 in FIG. 1 has a large overshoot, on the contrary, in the control system 40 of the present invention, with the second multiple m increasing, the corresponding overshoot is minimized, and the rise time of the step response approaches to 20 ms more and more.

Figure 7:
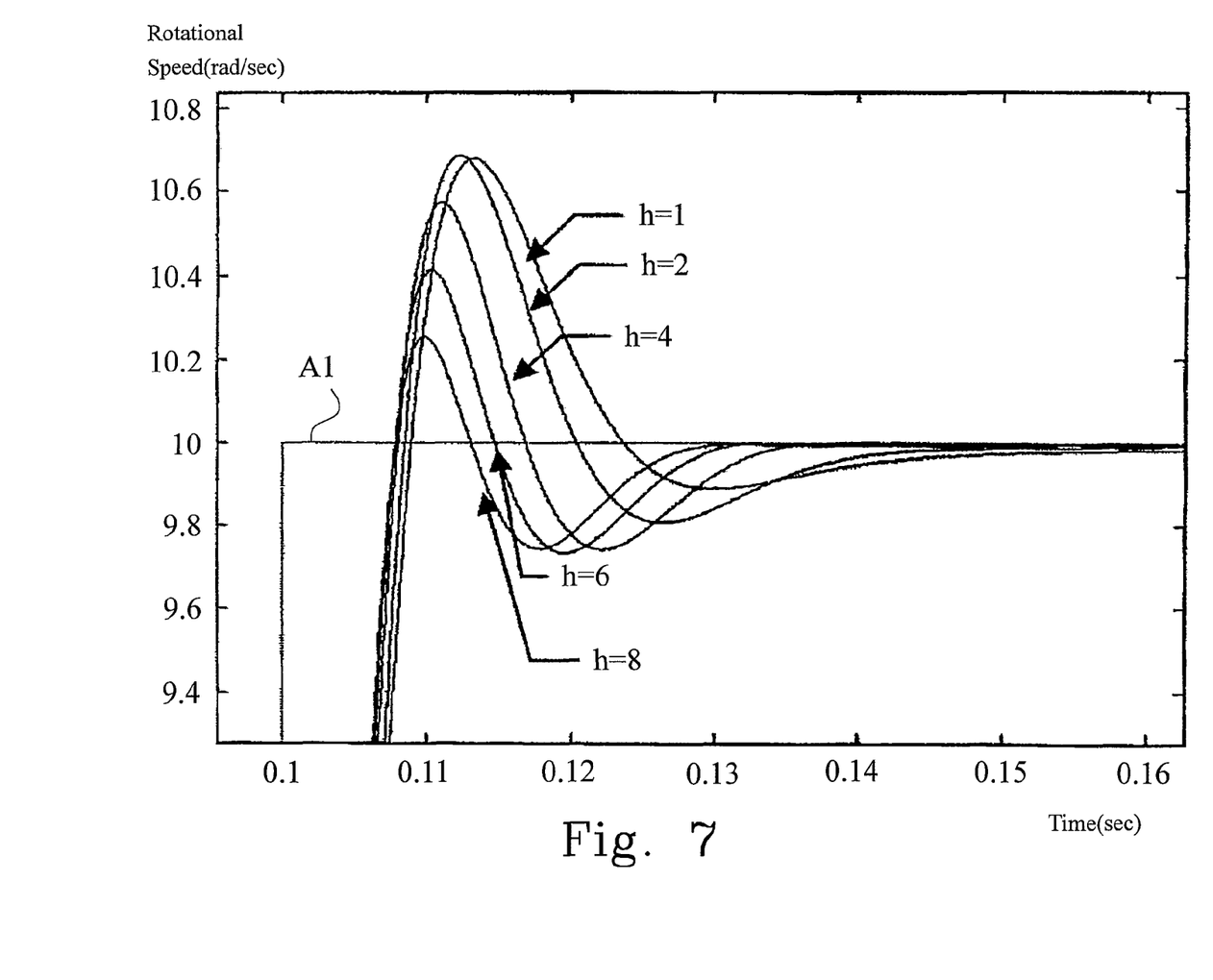
FIG. 7 is a diagram showing the third step response of the control system showing in FIG. 4.

The influence of the first multiple h to the control system 40 is illustrated in FIG. 7, which is a diagram of the third step response of the control system 40 in FIG. 4. In FIG. 7, the target bandwidth $B_w$ is set as $B_w=50$ Hz and the second multiple m is set as m=1, and then the first multiple m is set varied as h=1, 2, 4, 6, 8. As shown in FIG. 6, there are an input signal curve of a step function command A1, the curves of the varied first multiple h=i (i=1, 2, 4, 6, 8) of the control system 40 in FIG. 4. As FIG. 7 shows, with the first multiple h increasing, the corresponding overshoot is minimized and the rise time of the step response approaches to 20 ms more and more.

According to the above illustration, the best setup of the system is the target bandwidth $B_w=50$ Hz, the first multiple h=1, and the second multiple m=4 when the control system 40 is demanded with the situation of the target bandwidth $B_w=50$ Hz and the rise time of the step response as 20 ms and processing without overshoot.

The influence of changing the estimated inertia value $J_\Sigma$ is then illustrated. When the relationship between the inertia of the load $J_d$ and the inertia of the motor $J_m$ is $J_d=10 J_m$, the estimated inertia value $J_\Sigma$ is set as $J_\Sigma=6 J_m$, $J_\Sigma=11 J_m$, and $J_\Sigma=16 J_m$ separately for observing the corresponding changes of the output signal Y of the controlled body 31 in the control system 40 in FIG. 4. The observing result is shown in FIG. 8, which is a diagram of the fourth step response of the control system 40 in FIG. 4.

Figure 8:
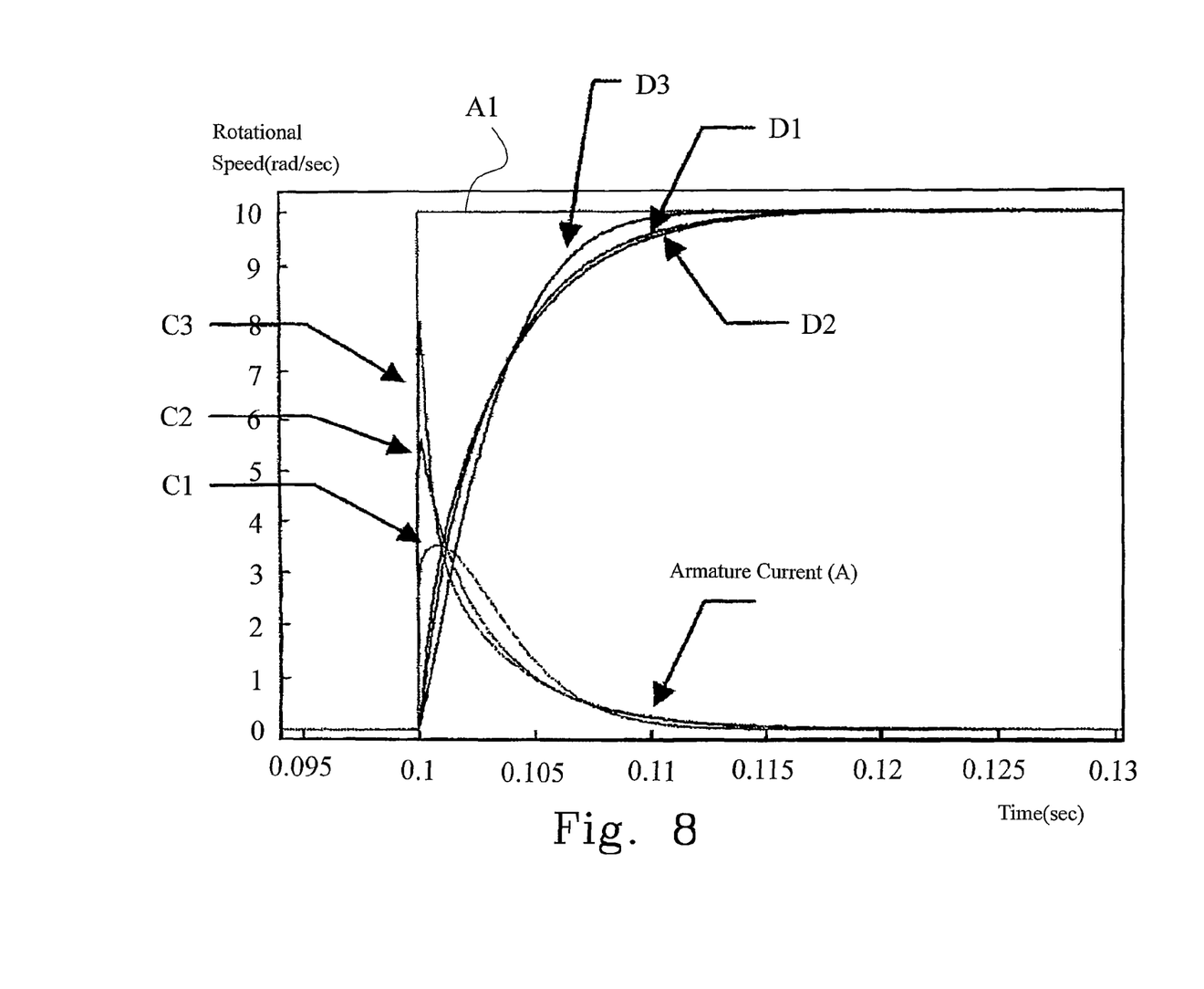
FIG. 8 is a diagram showing the fourth step response of the control system showing in FIG. 4.

In FIG. 8, there are an input signal curve of a step function command A1, the third operating signal curves Ci (i=1~3) in the conditions of varied estimated inertia value $J_\Sigma$ ($J_\Sigma=6 J_m$, 11 $J_m$, 16 $J_m$), and the output signal curves Di (i=1~3). The third operating signal curve C1 is based on the estimated inertia value $J_\Sigma=6 J_m$, while the third operating signal curve C2 is based on the estimated inertia value $J_\Sigma=11 J_m$ and the third operating signal curve C3 is based on the estimated inertia value $J_\Sigma=16 J_m$. The output signal curve D1 is based on the estimated inertia value $J_\Sigma=6 J_m$, while the output signal curve D2 is based on the estimated inertia value $J_\Sigma=11 J_m$ and the output signal curve D3 is based on the estimated inertia value $J_\Sigma=16 J_m$.

The three third operating signal curves Di (i=1~3) is obtained by the operation of the master control unit 32, the first adjusting unit 33, and the second adjusting unit 34 via the weighting of the first multiple h and the second multiple m. As FIG. 8 shows, the control system 40 of the present invention has a well robustness with regard to the change of the estimated inertia value $J_\Sigma$.

Similarly, the influence of changing the inertia of the $J_d$ is then illustrated. When the relationship between the inertia of the load $J_d$ and the inertia of the motor $J_m$ is $J_d=11 J_m$, the estimated inertia value $J_d$ is set as $J_d=5 J_m$, $J_d=10 J_m$, and $J_d=15 J_m$ separately for observing the corresponding changes of the output signal Y of the controlled body 31 in the control system 40 in FIG. 4. The observing result is shown in FIG. 9, which is the fifth step response diagram of the control system 40 in FIG. 4.

Figure 9:
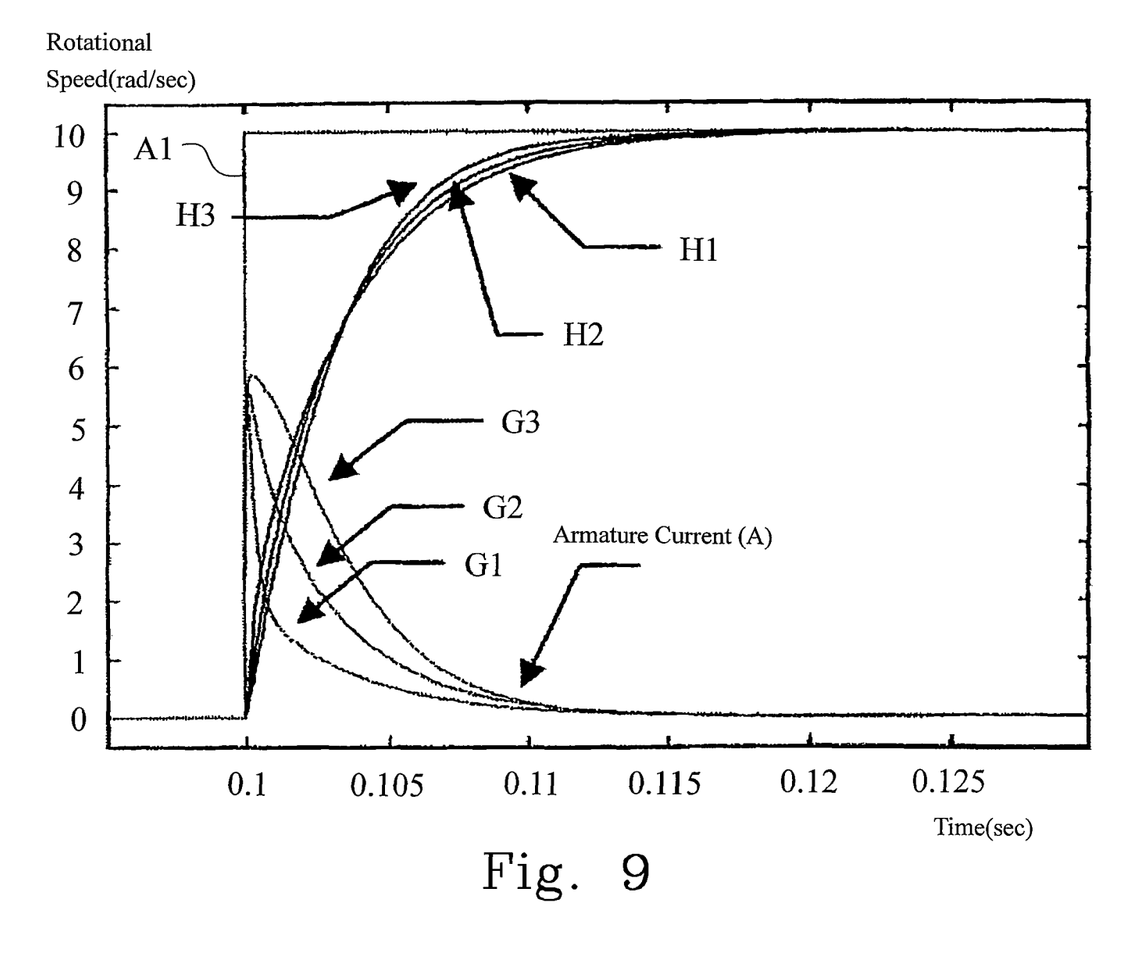
FIG. 9 is a diagram showing the fifth step response of the control system showing in FIG. 4.

In FIG. 9, there are an input signal curve of a step function command A1, the third operating signal curves Gi (i=13) and the output signal curves Hi (i=1~3) in the conditions of varied inertia of the load $J_d$ ($J_d=5 J_m$, 10 $J_m$, 15 $J_m$). The third operating signal curve G1 is based on the inertia of the load $J_d=5 J_m$, while the third operating signal curve G2 is based on the inertia of the load $J_d=10 J_m$ and the third operating signal curve G3 is based on the inertia of the load $J_d=15 J_m$. The output signal curve H1 is based on the inertia of the load $J_d=5 J_m$, while the output signal curve H2 is based on the inertia of the load $J_d=10 J_m$ and the output signal curve H3 is based on the inertia of the load $J_d=15 J_m$. As FIG. 9 shows, the control system 40 of the present invention has a well robustness with regard to the change of the inertia of the load $J_d$.

The adjusting method of the control system 30 for adjusting an output signal Y generated by a controlled body 31 is illustrated as following. The method includes steps of:

(a) setting up a target bandwidth $B_w$ for the control system 30;

(b) designing a control function based on the target bandwidth $B_w$, and thereby causing an open loop bandwidth of the control system approaching to the target bandwidth $B_w$ and generating a first operating signal $U_1$, wherein the control function is the transfer function of the master control unit 32;

(c) generating a first adjusting signal $Q_1$ based on the first operating signal $U_1$; and (d) calculating the first adjusting signal $Q_1$, the output signal Y and the first operating signal $U_1$ for generating a second operating signal $U_2$, and thereby causing the output signal Y approaching to the first adjusting signal $Q_1$ by feeding the second operating signal $U_2$ back to the controlled body 31 generating the output signal Y.

The step (c) in the above-mentioned method further includes the steps of:

(c1) designing a first adjusting function according to a responsive behavior of the controlled object 31, wherein the first adjusting function is the transfer function of the first adjusting unit 33; and (c2) providing the first operating signal $U_1$ for the first adjusting function for generating the first adjusting signal $Q_1$.

The step (d) in the above-mentioned method further comprises the steps of:

(d1) generating a first result signal $T_1$ by subtracting the output signal Y from the first adjusting signal $Q_1$;

(d2) generating a second result signal $T_2$ by amplifying the first result signal $T_1$ by a first multiple h;

(d3) generating the second operating signal $U_2$ by summing up the second result signal $T_2$ and the first operating signal $U_1$; and (d4) adjusting the value of the first multiple h so that the output signal Y approaches to the first adjusting signal $Q_1$.

Following the step (d) in the above-mentioned method further includes the steps of:

(e) providing an input signal R to a second adjusting function for generating a second adjusting signal $Q_2$, wherein the second adjusting function is the transfer function of the second adjusting unit 34; and (f) calculating the second adjusting signal $Q_2$, the output signal Y and the input signal R to generate a third operating signal $U_3$, and causing the transfer function of the control system 30 approaching to the second adjusting function.

The step (f) in the above-mentioned method further includes the steps of:

(f1) generating a third result signal $T_3$ by subtracting the output signal Y from the second adjusting signal $Q_2$;

(f2) receiving the third result signal $T_3$ and processing the third result signal by an integral calculation, so as to generate a fourth result signal $T_4$, wherein the integral calculation is processed by the integral function F in the loop stabilizer 343;

(f3) generating a fifth result signal $T_5$ by amplifying the fourth result signal $T_4$ by a second multiple m;

(f4) generating the third operating signal $U_3$ by summing up the fifth result signal $T_5$ and the input signal R and taking off the output signal Y; and (f5) adjusting the value of the second multiple m so that the transfer function of the control system 30 approaches to the second adjusting function.

The characteristic of the invention is: a control system for controlling an output signal produced by a controlled object, the control system includes a master control unit, a first adjusting unit and a second adjusting unit. By the adjustment of the two weighting parameters, i.e. the first multiple and the second multiple, the robustness and fast response of the control system are obtained, and the overshoot of the output signal of the controlled body is diminished and approaches to zero. The control system has the technical features of the target bandwidth, resisting the interference of low frequency, and transfer function following, which is achieved by the adjustment and control in the substantial machine via the designing of the master control unit, the first adjusting unit, and the second adjusting unit, and the adjustment of the two weighting parameters of the first multiple and the second multiple.

In sum, the efficacy and the progressiveness of the control system and the adjusting method of present invention are surely obtained, while the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A control system controlling an output signal produced by a controlled object, the control system having a bandwidth and represented by a first mathematic model having a first transfer function, the control system comprising:

a master control unit represented by a second mathematic model having a second transfer function configured to make an open loop bandwidth of the control system approach to a target bandwidth and generate a first operating signal;

a first adjusting unit represented by a third mathematic model having a third transfer function and configured to receive the first operating signal and generate a first adjusting signal, wherein the first adjusting signal, the output signal, and the first operating signal are calculated for generating a second operating signal, and the output signal approaches to the first adjusting signal, so that an interference signal the controlled object subjects is offset; and a second adjusting unit represented by a fourth mathematic model having a fourth transfer function and configured to receive an input signal for generating a second adjusting signal, wherein the second adjusting signal, the output signal and the input signal are calculated for generating a third operating signal, which is provided for the master control unit and causes the first transfer function of the control system approaching to the fourth transfer function of the second adjusting unit.

2. The control system according to claim 1, wherein the master control unit comprises a Proportional Integral (PI) Controller.

3. The control system according to claim 1 further comprising:

a first adder configured to generate a first result signal by subtracting the output signal from the second adjusting signal;

a loop stabilizer receiving the first result signal to generate a second result signal, and represented by a fifth mathematic model having an integral function to cause the control system to obtain a status of zero steady state error;

a first amplifier receiving the second result signal and generating a third result signal by amplifying the second result signal by a first multiple, wherein the first multiple is adjusted so that the first transfer function of the control system approaches to the fourth transfer function of the second adjusting unit; and a second adder configured to generate the third operating signal by summing up the input signal and the third result signal and taking off the output signal.

4. The control system according to claim 1, wherein the controlled object is a motor.

5. The control system according to claim 1, wherein when the controlled object is a motor, the controlled object has a physical behavior presented by the first transfer function, $K_t/((J_m+J_d)s+B)$, wherein $J_m$ is an inertia of the motor, $J_d$ is an inertia of a load, B is a damping coefficient, and $K_t$ is a ratio;

the second transfer function of the master controlled unit is $2\pi B_w J_\Sigma/K_t$, wherein $B_w$ is the target bandwidth and $J_\Sigma$ is an estimated inertia value of $(J_{m+}+J_d)$;

the third transfer function of the first adjusting unit is $K_t/(J_\Sigma s)$; and the fourth transfer function of the second adjusting unit is $K_f/(J_\Sigma s)$.

6. A control system controlling an output signal produced by a controlled object, the control system having a bandwidth and represented by a first mathematic model having a first transfer function, the control system comprising:
- a master control unit represented by a second mathematic model having a second transfer function configured to make an open loop bandwidth of the control system approach to a target bandwidth, and generate a first operating signal;
- a first adjusting unit represented by a third mathematic model having a third transfer function and configured to receive the first operating signal and generate a first adjusting signal, wherein the first adjusting signal, the output signal, and the first operating signal are calculated for generating a second operating signal, and the output signal approaches the first adjusting signal, so that an interference signal the controlled object subjects is offset;
- a first adder configured to generate a first result signal by subtracting the output signal from the first adjusting signal; and
- a first amplifier configured to receive the first result signal and generate a second result signal by amplifying the first result signal by a first multiple, wherein the first multiple is adjusted so that the output signal approaches to the first adjusting signal.

7. The control system according to claim 6, wherein the controlled object has a physical behavior and the master control unit is designed according to the physical behavior of the controlled object.

8. The control system according to claim 6, wherein the master control unit comprises a Proportional Integral (PI) Controller.

9. The control system according to claim 6, wherein the controlled object has a responsive behavior and the first adjusting unit is designed according to the responsive behavior of the controlled object.

10. The control system according to claim 6 further comprising a second adder configured to sum the second operating signal and the interference signal and provide the controlled object with a summation result of the second operating signal and the interference signal.

11. The control system according to claim 6 further comprising a second adjusting unit represented by a fourth mathematic model having a fourth transfer function and configured to receive a input signal and thereby generate a second adjusting signal, wherein the second adjusting signal, the output signal and the input signal are calculated for generating a third operating signal provided to the master control unit, so that the first transfer function of the control system approaches to the fourth transfer function of the second adjusting unit.

12. The control system according to claim 11 further comprising:
- a third adder configured to generate a third result signal by subtracting the output signal from the second adjusting signal;
- a loop stabilizer configured to receive the third result signal, and thereby generate a fourth result signal, the loop stabilizer represented by a fifth mathematic model having an integral function to cause the control system to obtain a status of zero steady state error;
- a second amplifier configured to receive the fourth result signal and generate a fifth result signal by amplifying the fourth result signal by a second multiple, wherein the second multiple is adjusted so that the first transfer function of the control system approaches to the fourth transfer function of the second adjusting unit; and
- a fourth adder configured to generate the third operating signal by summing up the input signal and the fifth result signal and taking off the output signal.

13. A adjusting method of a control system for adjusting an output signal generated by a controlled object, the control system having a bandwidth and represented by a first mathematic model having a first transfer function, the method comprising:
- (a) setting up a target bandwidth for the control system;
- (b) designing a control function based on the target bandwidth, and thereby causing a open loop bandwidth of the control system approaching to the target bandwidth and generating a first operating signal;
- (c) generating a first adjusting signal based on the first operating signal;
- (d) generating a first result signal by subtracting the output signal from the first adjusting signal;
- (e) generating a second result signal by amplifying the first result signal by a first multiple;
- (f) generating a second operating signal by summing up the second result signal and the first operating signal; and
- (g) adjusting the value of the first multiple so that the output signal approaches to the first adjusting signal by feeding the second operating signal back to the controlled object generating the output signal.

14. The method according to claim 13, wherein the step (c) further comprises the steps of:
- (c1) designing a first adjusting function according to a responsive behavior of the controlled object; and
- (c2) processing the first operating signal by the first adjusting function for generating the first adjusting signal.

15. The method according to claim 13 further comprising the steps of:
- (h) providing an input signal to a second adjusting function for generating a second adjusting signal; and
- (i) calculating the second adjusting signal, the output signal and the input signal to generate a third operating signal, and causing the first transfer function of the control system approaching to the second adjusting function.

16. The method according to claim 15, wherein the step (i) further comprises the steps of:
- (i1) generating a third result signal by subtracting the output signal from the second adjusting signal;
- (i2) receiving the third result signal and processing the third result signal by an integral calculation, so as to generate a fourth result signal;
- (i3) generating a fifth result signal by amplifying the fourth result signal by a second multiple;
- (i4) generating the third operating signal by summing up the fifth result signal and the input signal and taking off the output signal; and
- (i5) adjusting the value of the second multiple so that the first transfer function of the control system approaches to the second adjusting function.

* * * * *